Feb. 5, 1935.  F. O. CLIZBE  1,989,740
ELECTROMAGNETIC BRAKE
Filed Feb. 10, 1933  2 Sheets-Sheet 1
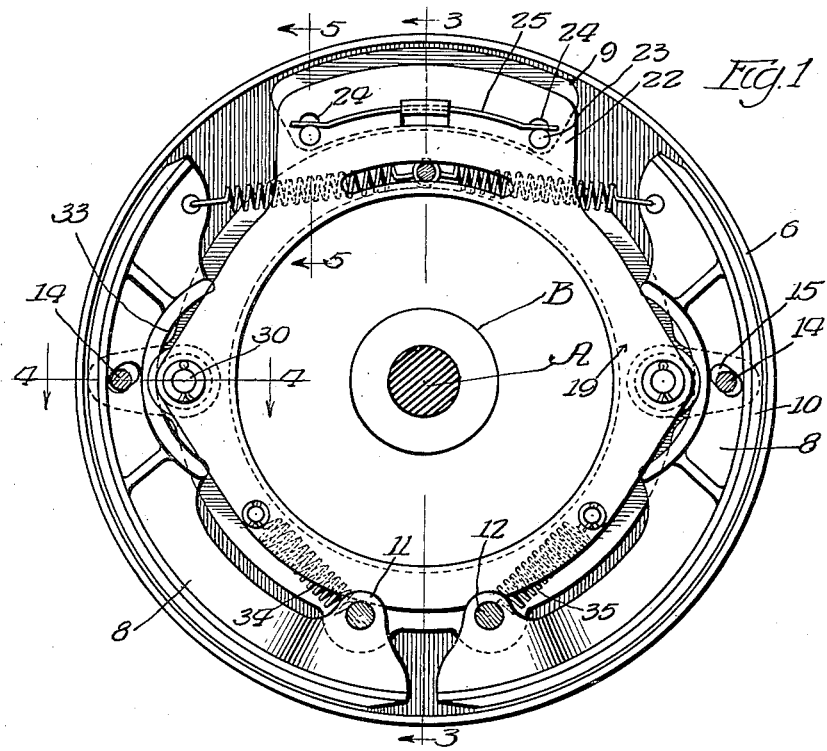
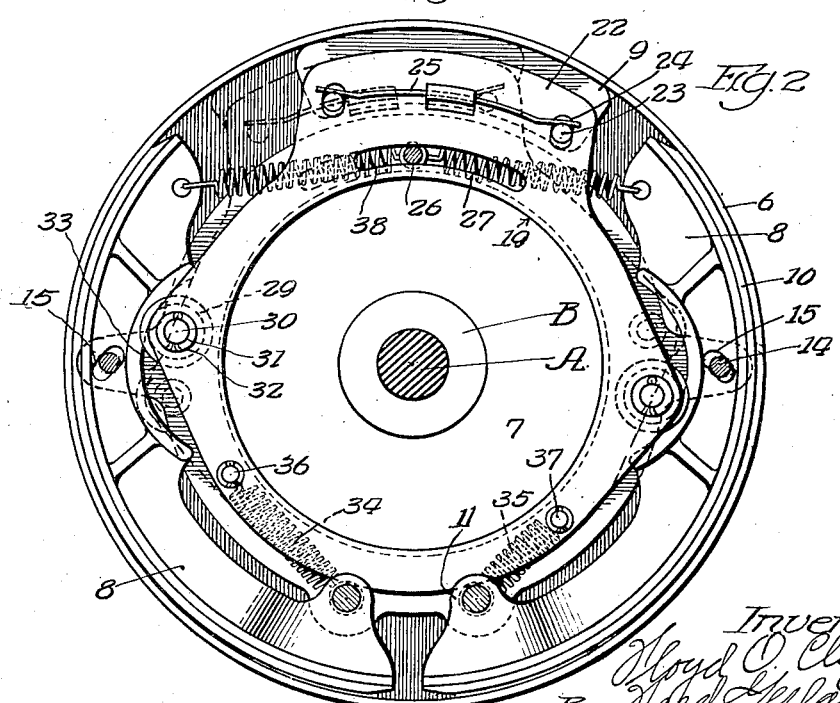

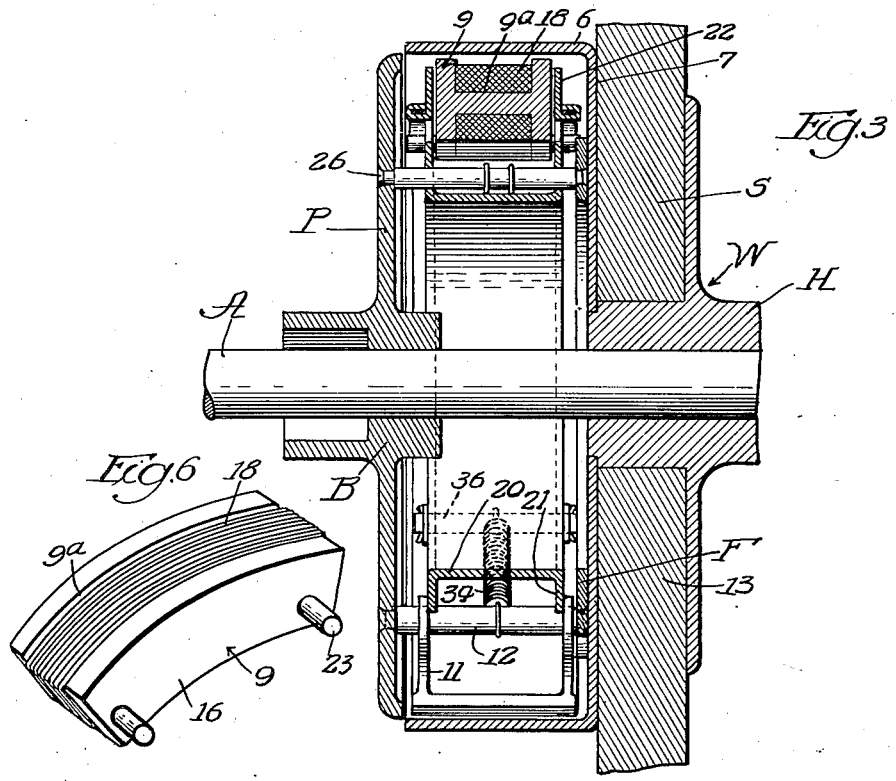
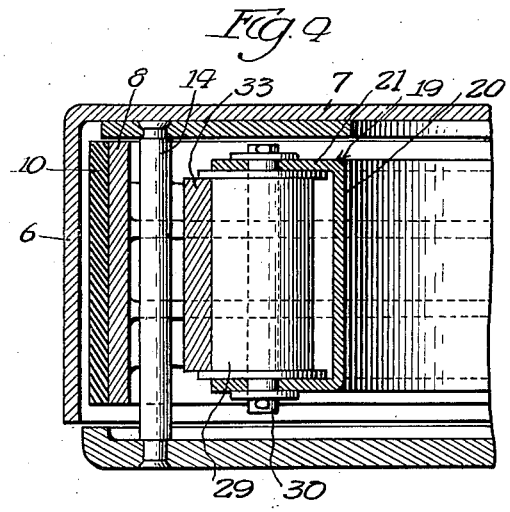
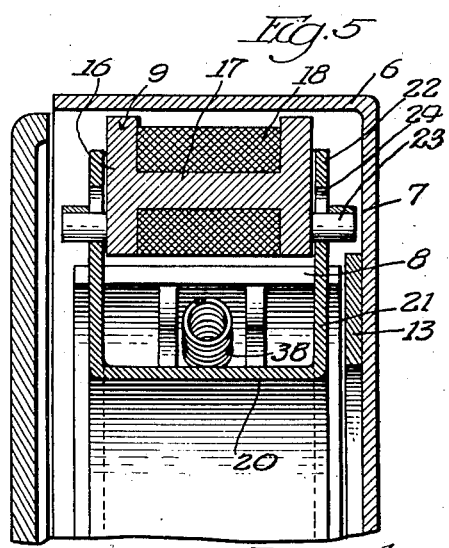

Patented Feb. 5, 1935

1,989,740

UNITED STATES PATENT OFFICE 1,989,740

ELECTROMAGNETIC BRAKE

Floyd O. Clizbe, Chicago, Ill.

Application February 10, 1933, Serial No. 656,084

12 Claims. (Cl. 188—140)

The present invention relates generally to electromagnetic brakes. More particularly, the invention relates to that type of electromagnetic brake which is adapted primarily for use in connection with one of the road-wheels of a vehicle and comprises a brake drum on the wheel, a shoe-like electromagnet which is disposed in the drum and is adapted when energized to be attracted to, and to rotate with, the drum, and a pair of brake shoes which are also disposed in the drum and are actuated into engagement or braking contact with the inner periphery of the drum in response to rotation of the electromagnet with the drum.

One object of the invention is to provide an electromagnetic brake of this type which is more efficient and positive in operation than previously designed brakes of the same general design by virtue of the fact that the brake shoes are pivotally mounted on fixed studs so as to swing outwardly into contact with the inner periphery of the drum and are actuated into their braking position in response to rotation of the electromagnet with the drum by means of a direct power-multiplying connection between the magnet and the shoes.

Another object of the invention is to provide a brake of the last mentioned character in which the power-multiplying connection for swinging or shifting outwardly the brake shoes into braking engagement or contact with the inner periphery of the drum consists of a ring-shaped element which is disposed in and is concentrically positioned with respect to the brake drum, is connected to the electromagnet so that it rotates therewith when the latter is energized and embodies rollers which engage cam surfaces on the brake shoes and cooperate therewith to actuate the brake shoes into their operative position in response to rotation of the ring-shaped element by the electromagnet.

Another object of the invention is to provide an electromagnetic vehicle brake of the type and character under consideration in which the ring-shaped element which constitutes the direct power-multiplying connection between the electromagnet and the brake shoe is of such diameter and construction that the entire inner portion of the brake drum is free and unobstructed.

Another object of the invention is the provision in an electromagnetic brake of the character hereinbefore specified of a novel spring arrangement for retracting the ring-shaped element and the brake shoes to their inoperative positions when the electromagnet is deenergized.

A further object of the invention is to provide an electromagnetic vehicle brake in which the electromagnet is so constructed and so mounted with respect to the ring-shaped element which forms the power-multiplying connection between the element and the brake shoes that in conjunction with the element, it effects a quick and forceful shift of the brake shoes into their braking position.

A still further object of the invention is the provision of an electromagnet which is adapted efficiently and effectively to serve as the actuating medium of a brake of the character under consideration and is of new and improved construction.

In addition, it is contemplated as one of the objects of the invention to provide an electromagnetic brake of the type under consideration which is generally of new and improved construction, may be manufactured at a low and reasonable cost, contemplates operation of both brake shoes regardless of the direction of travel of the road-wheels and is an improvement upon that exhibited in United States Letters Patent No. 1,783,280 granted to me December 2, 1930.

Other objects of the invention and the various advantages and characteristics of the present brake construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical, longitudinal, sectional view of an electromagnetic brake embodying the invention, the various parts of the brake being shown in their inoperative position.

Figure 2 is a similar sectional view showing the parts of the brake in their operative or braking position;

Figure 3 is a vertical transverse section taken on the line 3—3 of Figure 1 and showing in detail the cross sectional construction of the ring-shaped element which forms the power-multiplying connection between the electromagnet and the brake shoes;

Figure 4 is an enlarged horizontal section taken on the line 4—4 of Figure 1 and illustrating the construction and arrangement of the rollers which are mounted on the ring-shaped element and operate in conjunction with the cam surfaces on the brake shoes and in response to rotation of the element by the electromagnet, to shift the brake shoes into their operative or braking position;

Figure 5 is an enlarged vertical, transverse, sectional view taken on the line 5—5 of Figure 1, exhibiting the construction and arrangement of the electromagnet and the manner in which it is connected to the ring-shaped element; and Figure 6 is a perspective of the magnet.

The electromagnetic brake which forms the subject matter of the invention comprises a metallic drum 6 and is adapted primarily for use in connection with a vehicle road-wheel W. The latter, as shown in Figure 3 of the drawings, is associated with an axle A and consists of a hub H and a plurality of spokes S. The axle A extends horizontally and is mounted rotatably in a bearing B which is attached to and forms a part of the chassis of the vehicle to which the brake is applied, and embodies a circular plate P inwardly of the wheel W. The hub of the wheel is splined or otherwise fixedly secured to the outer end of the axle A and is provided with a radially extending flange F to which the inner ends of the spokes are secured and from which the spokes radiate, as well understood in the art.

The brake drum 6 is cylindrical and is positioned between the plate P and the inner side of the wheel W. It is of substantially the same diameter as the plate P and is secured fixedly to the wheel by way of a side plate 7 which is formed integrally with the drum and fits against and is secured to the inner ends of the spokes S. The central portion of the side plate 7 is attached to the hub H and is apertured so as to permit the axle A to pass therethrough. The plate P on the bearing B closes and forms a side for the inner side of the drum 6. The side plate 7 closes the other side of the drum and forms a connection whereby the drum 6 is driven or rotated with the wheel W.

In addition to the drum 6, the brake comprises a pair of brake shoes 8 and an electromagnet 9. The shoes 8 extend substantially vertically and are positioned one directly opposite the other in the drum 6. They are curved conformably to the inner periphery of the brake drum and have on the outer faces thereof brake linings 10 for engagement with the inner periphery of the drum. The lower ends of the brake shoes embody inwardly extending lugs 11 and are pivotally connected by these lugs to horizontally extending studs 12 so that they are free to swing outwardly into contact and braking relation with the inner periphery of the drum. The studs 12 are anchored to, and project outwardly from the plate P of the bearing B and hold the brake shoes against rotation relatively to the brake drum. They extend through the lugs 11 on the lower ends of the brake shoes and are connected at the outer ends thereof to an annulus 13 of non-magnetic material. The latter, as shown in Figures 3 and 5, is concentrically positioned with respect to the brake drum 6 and serves to hold the brake shoes against transverse displacement with respect to the studs. Swinging of the brake shoes to and from the brake drum is restricted or limited by means of a pair of pins 14. The latter are secured fixedly to, and project outwardly from, the plate P of the bearing B like the pivot studs 12, and extend through elongated slots 15 in the central portions of the brake shoes. These slots are slightly curved and in conjunction with the pins 14 permit of limited swinging of the brake shoes to and from the inner periphery of the drum. The outer ends of the pins are connected to the annulus 13.

The electromagnet 9 is in the form of a soft iron shoe and is positioned in the brake drum between the upper ends of the brake shoes 8. It is curved conformably to the inner periphery of the brake drum and is cut away so that it embodies a groove 9ª extending longitudinally therearound. This groove is preferably of the character shown in Figure 5 and serves to form a pair of laterally spaced, pole pieces 16 and a core piece 17 between the two pole pieces. A wire 18 is coiled around the core 17 and is connected in any suitable manner to receive electrical energy or current from a battery or generator on the chassis of the vehicle to which the brake is applied. When current flows through the wire coils, the magnet is energized and is attracted to the drum 6. If the wheel W is in rotation, the electromagnet, because of its adherence to the brake drum, is rotated in the direction of rotation of the wheel. This rotative movement of the magnet is utilized to effect shift of the brake shoes into their operative or braking position, as hereinafter described. When the magnet is energized, a bipolar magnetic field is established because of the construction of the magnet, and the drum forms or operates as the yoke of the magnetic field. By virtue of the fact that the core piece of the magnet is comparatively long and the portion of the drum which serves as the yoke of the magnetic field is small in comparison, maximum adhesion of the magnet to the drum is obtained with a minimum amount of current. This feature is of considerable importance as far as the operation of the drum is concerned, inasmuch as the electrical system of an automobile is of comparatively small voltage and amperage. The core 17 is preferably formed so that it is nearer the inner edges of the pole pieces 9 than the outer edges. As a result of this arrangement, the wire coils are spaced inwardly from the outer edges of the pole pieces of the magnet and do not engage the inner periphery of the brake drum 6 when the magnet is brought into adhering relation with the drum. When the magnet is energized, only the outer edges of the pole pieces 9 engage the inner periphery of the drum.

The electromagnet 9 is connected to actuate the brake shoes 8 by means of a ring-shaped element 19. This element is disposed in, and is positioned concentrically with respect to, the brake drum 6 and is of channel formation. It consists of a cylindrical base 20 and a pair of outwardly extending radial side flanges 21 and is preferably formed of non-magnetic material. The side flanges 21 are preferably formed integrally with the base 20 of the element and embody at the upper or top portions thereof circumferentially elongated extensions 22 for supporting the electromagnet 9. The magnet, as shown in Figures 3 and 5, is positioned between these two extensions 22 and embodies at the ends thereof transversely extending pins 23. The ends of these pins extend through elongated slots 24 in the ends of the extensions 22 and form with the slotted portions of the extensions between the magnet and the extensions, sliding connections whereby the magnet is supported so that it is free to move radially into and out of engagement with the inner periphery of the brake drum 6. The slots 24 are preferably of such length that the movement of the magnet to and from the drum is limited to a comparatively small distance. The magnet is normally held in its inoperative position wherein it is out of contact with the inner periphery of the drum, by means of a pair of leaf springs 25. These springs are centrally supported by way of brackets on the outer faces of the elongated extensions 22 and are arranged so that the ends thereof bear against the ends of the pins 23. When the electromagnet 9 is energized, it is attracted to the drum and moves outwardly into contact with the drum against the combined force of the springs 25. When the magnet is deenergized, the springs which, as previously pointed out, are applied to the ends of the pins 23, shift the magnet downwardly into its inoperative position. The pins 23, together with the slotted portions of the extensions 22, in addition to forming sliding connections between the magnet and the extensions, connect the magnet to the ring-shaped element 19 so that the latter is rotated by the magnet in response to rotation of the magnet with the drum. The element 19 is rotatably supported within the drum by means of the pivot studs 12 for the brake shoes and a pin 26. This pin is fixed to, and projects outwardly from, the plate P of the bearing B and is positioned directly beneath the electromagnet 9. It extends through arcuate slots 27 in the inner portions of the extensions 22 and is connected at its outer end to the annulus 13 which operates to hold the element against transverse or lateral displacement with respect to the pin. The slots 27 are concentrically positioned with respect to the axis of the wheel W and hence permit the element to rotate about the wheel axis. The lower portions of the side flanges 21 of the ring-shaped element rest upon the pivot lugs 12, as shown particularly in Figures 2 and 3 of the drawings, so that these studs in conjunction with the pin 26, operate to support the element for rotative movement.

In order to effect outward shift of the brake shoes in response to rotation or turning of the magnet with the brake drum, the ring-shaped element 19 is provided at diametrically opposite points with a pair of rollers 29. These rollers are positioned directly opposite the central portions of the brake shoes, as shown in Figures 1 and 2, and are mounted rotatably on pins 30. The latter extend through aligned holes or apertures in the side flanges 21 of the ring-shaped element 19 and support the rollers between the side flanges. The ends of the pins 30 are provided with washers 31 which are held in place by cotter pins 32 and serve to hold the pins against axial displacement with respect to the element 19. The rollers are supported by the pins so that they engage arcuate surfaces 33 on the inner sides of the brake shoes. These surfaces are centrally positioned with respect to the brake shoes and face towards the center of the brake drum. The radius of the surfaces 33 is materially less than the radius of the base 20 of the ring-shaped element 19. Because of this fact, the surfaces 33 are in the nature of cam or wedge surfaces and coact with the rollers 29 to effect outward shift of the brake shoes in response to rotation of the ring-shaped element 19 in either direction. When the ring-shaped element 19 is in its inoperative position, the rollers are positioned centrally with respect to the surfaces 33 and in this position exert no outward thrust or pressure on the brake drum. When the element 19 is rotated in response to turning or rotation of the magnet with the brake drum, the rollers 29 roll towards the end portions of the surfaces 33 and as the result of the cam or wedge formation of the surfaces, shift the brake shoes outwardly into contact or braking engagement with the inner periphery of the drum. The arrangement of the rollers and cam surfaces is such that the outward movement of the brake shoes is comparatively small in proportion to the rotative movement of the magnet. With this arrangement, the necessary leverage is obtained effectively and positively to brake the drum by the rotative movement of the magnet in response to drum rotation. The ring-shaped element 19 together with the rollers 29 and the wedge or cam surfaces 33 on the brake shoes exemplify a power-multiplying connection whereby outward shift of the brake shoes is effected in response to rotation of the electromagnet with the drum. By virtue of the fact that the element 19 is ring-shaped, the central portion of the brake drum is free and unobstructed.

The ring-shaped element 19 is retracted to its inoperative position when the magnet is deenergized by means of a pair of tension springs 34 and 35. The spring 34 extends between and is connected to one of the pivot studs 12 and a pin 36 on the element 19, and serves to retract the element after rotation thereof in one direction. The spring 35 extends between the other pivot stud 12 and a pin 37 on the element 19 and operates to retract the element when it is rotated in the opposite direction. The two springs 34 and 35 extend in opposite directions and are applied to the central portions of the pivot lugs 12. The pins 36 and 37 extend transversely with respect to the ring-shaped element 19 and project through and are secured in aligned apertures or holes in the side flanges 21. The brake shoes 8 are returned to their inoperative position upon release of the ring-shaped element 19 by means of a pair of tension springs 38. These springs extend between and are connected to the guide pin 26 and the upper or distal ends of the brake shoes 8.

The operation of the brake is as follows:

When it is desired to brake the wheel W to which the brake is applied, electrical current or energy is supplied to the wire coils 18 around the core pieces 17 so as to energize the magnet 9. The magnet, as soon as it becomes energized, moves outwardly into contact with the brake drum and because of its adhesion or attraction for the brake drum revolves with the brake drum and rotates the ring-shaped element 19. This rotation of the element causes the rollers 30, as previously pointed out, to roll towards the end portions of the arcuate wedge or cam surfaces 33 and in conjunction with the brake surfaces, to shift the brake shoes outwardly into braking contact with the brake drum. During the braking operation, the magnet slides with respect to the inner periphery of the drum, but because of its attraction to the drum, sets up sufficient torque or angular movement as far as the ring-shaped element 19 is concerned, to effect the proper outward thrust of the brake shoes through the medium of the rollers 30 and the surfaces 33. When the electric current or energy is cut off and the magnet becomes deenergized, the leaf springs 25 at the sides of the elongated extensions 23 shift the magnet downwardly away from the inner periphery of the brake drum. At the same time, the springs 25 shift downwardly or retract the electromagnet 9, the springs 34 and 35 retract the ring-shaped element 19 to its inoperative position and the springs 38 swing inwardly the brake shoes 28 so as to break contact of the brake linings 10 with the inner periphery of the brake drum. Regardless of whether the wheel W is rotating forwardly or rearwardly, shift of both brake shoes into contact or braking engagement with the drum is effected when the electromagnet is energized.

The herein described electromagnetic brake consists of but a small number of parts and hence may be manufactured at a low and reasonable cost. By virtue of the fact that the electromagnet actuates the brake shoes through a power-multiplying connection, braking of the drum is effected quickly and positively.

Whereas the brake has been described as being adapted primarily for use in connection with one of the road-wheels of a vehicle, it is to be understood that the brake may be used in other ways. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In an electric brake of the character described, the combination of a rotatable drum, a brake shoe mounted within the drum to swing on a fixed pivot into and out of braking relation with the drum, an electromagnet positioned in the drum and adapted when energized to be attracted to and rotated by the drum, and a power-multiplying connection for swinging the brake shoe into braking relation with the drum in response to rotation of the electromagnet, comprising an element rotatably mounted within the drum and connected directly to the electromagnet so as to rotate therewith, and coacting cam and roller means operable by rotation of the element for camming said shoe into its aforesaid braking relation with the drum.

2. In an electric brake of the character described, the combination of a rotatable drum, a brake shoe mounted within the drum to swing on a fixed pivot into and out of braking relation with the drum, an electromagnet positioned in the drum and adapted when energized to be attracted to and rotated by the drum, and a power-multiplying connection for swinging the brake shoe into braking relation with the drum in response to rotation of the electromagnet, comprising a ring-shaped element mounted rotatably in the drum and connected directly to the electromagnet so as to rotate therewith and coacting cam and roller means between the element and the shoe whereby the shoe is cammed into its braking relation with the drum upon rotation of the element with the magnet.

3. In an electric brake of the character described, the combination of a rotatable drum, a brake shoe mounted in the drum and on a fixed pivot to swing laterally into and out of braking relation with the drum and having on the inner part thereof a wedge or cam surface, an electromagnet positioned in the drum and adapted when energized to be attracted to and rotated by the drum, and a power-multiplying connection for swinging the brake shoe into braking relation with the drum in response to rotation of the electromagnet, comprising an element mounted rotatably in the drum and connected to rotate with the magnet, and a member carried on the element arranged to engage the aforesaid surface on the brake shoe to swing the brake shoe outwardly into its braking relation with the drum upon rotation of the element.

4. In an electric brake of the character described, the combination of a rotatable drum, a brake shoe mounted in the drum and on a fixed pivot to swing laterally into and out of braking relation with the drum and having on the inner part thereof a wedge or cam surface, an electromagnet positioned in the drum and adapted when energized to be attracted to and rotated by the drum, and a power-multiplying connection for swinging the brake shoe into braking relation with the drum in response to rotation of the electromagnet, comprising an element mounted rotatable in the drum and connected to rotate with the magnet, and a roller on the element engaging the aforesaid cam or wedge surface on the brake shoe and operable upon rotation of the element and in conjunction with the surface to shift outwardly the brake shoe into braking relation with the drum.

5. In an electric brake of the character described, the combination of a rotatable drum, a pair of oppositely facing brake shoes in the drum mounted pivotally to swing outwardly into braking relation with the drum and embodying cam or wedge surfaces on the inner parts thereof, an electromagnet disposed in the drum between contiguous or opposite ends of the brake shoes and adapted when energized to be attracted to and rotated by the drum, and a power-multiplying connection for swinging the brake shoes into braking relation with the drum in response to rotation of the electromagnet, comprising a ring-shaped element mounted rotatably in the drum and between the shoes and connected to rotate with the magnet, and members carried on substantially diametrically opposite parts of the element and engaging the aforesaid cam or wedge surfaces on the shoes in such a manner as to cam or wedge the shoes outwardly against the brake drum upon rotation of the element.

6. In an electric brake of the character described, the combination of a rotatable drum, a pair of oppositely facing brake shoes in the drum mounted pivotally to swing outwardly into braking relation with the drum and embodying cam or wedge surfaces on the inner parts thereof, an electromagnet disposed in the drum between contiguous or opposite ends of the brake shoes and adapted when energized to be attracted to and rotated by the drum, and a power-multiplying connection for swinging the brake shoes into braking relation with the drum in response to rotation of the electromagnet, comprising a ring-shaped element mounted rotatably in the drum and between the shoes and connected to rotate with the magnet, and rollers carried on substantially diametrically opposite parts of the ring-shaped element and mounted so that they engage the aforementioned cam or wedge surfaces on the shoes and coact therewith to cam the shoes outwardly against the drum upon rotation of the element.

7. In a brake, the combination of a rotatable drum, a pair of brake shoes positioned one opposite to the other within the drum and mounted pivotally to swing outwardly into braking relation with the drum, a member disposed in the drum between contiguous or opposite ends of the brake shoes and adapted to be shifted into contact with the drum for rotation therewith, a power-multiplying connection for swinging the brakes outwardly into braking relation with the drum in response to rotation by the member, comprising a ring-shaped element mounted rotatably in the drum and between the shoes and connected to rotate with the member, and co-acting cam and roller means between the element and the shoes for camming the shoes outwardly against the drum upon rotation of the element, and spring means for urging the brake shoes out of braking relation with the drum.

8. In a brake of the character described, the combination of a rotatable drum, a pair of oppositely facing brake shoes in the drum mounted pivotally to swing outwardly into braking relation with the drum and having cam or wedge surfaces in the inner parts thereof, a member disposed in the drum between contiguous or opposite ends of the brake shoes and adapted to be shifted into contact with the drum for rotation therewith, and a power-multiplying connection for swinging the shoes outwardly into braking relation with the drum in response to rotation of the member with the drum, comprising a ring-shaped element mounted rotatably in the drum between the shoes and connected for rotation with the member, and rollers carried by the element at substantially diametrically opposite points and arranged so that they engage the aforementioned cam or wedge surfaces and operate therewith to cam the shoes outwardly into engagement with the drum upon rotation of the element.

9. In a brake, the combination of a rotatable drum, a brake shoe in the drum pivotally supported so as to swing outwardly into braking relation with the drum and having a cam or wedge surface in the inner part thereof, a member disposed in the drum between contiguous or opposite ends of the brake shoes and adapted to be shifted into contact with the drum for rotation therewith, and a power-multiplying connection for swinging the shoe outwardly into braking relation with the drum in response to rotation of the member, comprising a ring-shaped element mounted rotatably in the drum and connected to rotate with the member, and a roller carried by the element and engaging the cam or wedge surface on the shoe so as to cam the shoe outwardly against the drum upon rotation of the element.

10. In a brake, the combination of a rotatable drum, a pair of oppositely facing brake shoes in the drum pivoted to swing outwardly into braking relation with the drum and having cam or wedge surfaces on the inner parts thereof, and a power-multiplying connection for swinging the brake shoes outwardly into braking relation with the drum, comprising a ring-shaped element rotatably mounted in the drum between the shoes, and rollers carried by the element and engaging the surfaces so as to shift the shoes outwardly into contact with the drum upon rotation of the element.

11. In an electric brake of the character described, the combination of a rotatable drum, a brake shoe mounted in the drum and arranged to move outwardly into braking relation with said drum, an electromagnet disposed in the drum and adapted when energized to be attracted to and rotated by the drum, said magnet being in the form of an elongated arcuate, metallic shoe and having a groove extending longitudinally therearound and forming laterally spaced pole pieces and a central core, and a wire coiled around the core so that the coils thereof extend parallel to and are positioned between the pole pieces, and means operated in response to rotation of the magnet with the drum for moving the brake shoe outwardly into braking relation with the drum.

12. As a new article of manufacture, an electromagnet for a brake of the drum type, comprising an elongated, arcuate, metallic shoe adapted to operate against the inner periphery of the drum of the brake and having a continuous longitudinal groove extending around the outer end and inner faces thereof and forming a pair of laterally spaced pole pieces and a core piece between the pole pieces, and a wire coiled around the core so that the coils thereof extend parallel to and are disposed between the two pole pieces.

FLOYD O. CLIZBE.